(12) United States Patent
Naji et al.

(10) Patent No.: US 6,907,708 B2
(45) Date of Patent: Jun. 21, 2005

(54) LIGHTWEIGHT WALL CONSTRUCTION

(75) Inventors: Basil Taha Naji, Toongabbie (AU); Graeme McGown, Turramurra (AU)

(73) Assignee: James Hardie International Finance (NL)

( * ) Notice: Subject to any disclaimer, the term of this patent is extended or adjusted under 35 U.S.C. 154(b) by 0 days.

(21) Appl. No.: 10/149,161

(22) PCT Filed: Dec. 8, 2000

(86) PCT No.: PCT/AU00/01524
§ 371 (c)(1),
(2), (4) Date: Jan. 17, 2003

(87) PCT Pub. No.: WO01/42164
PCT Pub. Date: Jun. 14, 2001

(65) Prior Publication Data
US 2003/0159391 A1 Aug. 28, 2003

(30) Foreign Application Priority Data
Dec. 10, 1999 (AU) .............................. PQ4570

(51) Int. Cl.$^7$ .............................................. C04B 14/00
(52) U.S. Cl. ..................... 52/742.14; 52/742.1; 52/425; 106/716
(58) Field of Search .................... 52/742.14, 742.1, 52/424, 425; 106/716, 86

(56) References Cited

U.S. PATENT DOCUMENTS

| | | | | |
|---|---|---|---|---|
| 3,668,150 A | * | 6/1972 | Horvitz ...................... | 106/643 |
| 3,989,534 A | * | 11/1976 | Plunguian et al. .......... | 106/646 |
| 4,092,109 A | * | 5/1978 | Rosenberg et al. ............ | 422/7 |
| 4,285,733 A | * | 8/1981 | Rosenberg et al. ......... | 106/640 |
| 4,365,999 A | * | 12/1982 | Fujita et al. ................. | 106/644 |
| 5,049,412 A | * | 9/1991 | Miller ........................ | 427/140 |
| 5,114,487 A | * | 5/1992 | Gartshore et al. .......... | 106/695 |
| 5,127,954 A | * | 7/1992 | Johnston et al. ............. | 106/644 |
| 5,198,082 A | * | 3/1993 | Vennesland et al. ........ | 205/734 |
| 5,422,141 A | * | 6/1995 | Hoopes et al. .............. | 427/299 |
| 5,435,846 A | * | 7/1995 | Tatematsu et al. .......... | 106/813 |
| 5,597,514 A | * | 1/1997 | Miksic et al. ............... | 252/390 |
| 5,634,966 A | * | 6/1997 | Berke et al. ............. | 106/14.41 |
| 5,709,743 A | * | 1/1998 | Leture et al. ............... | 106/713 |
| 5,728,209 A | * | 3/1998 | Bury et al. ................. | 106/819 |
| 6,379,031 B1 | * | 4/2002 | Weingart et al. ............... | 366/8 |
| 6,401,417 B1 | * | 6/2002 | Leblang ..................... | 52/481.1 |
| 6,402,990 B1 | * | 6/2002 | Marazzani et al. .... | 252/389.31 |
| 6,610,138 B1 | * | 8/2003 | Brown ........................ | 106/640 |
| 6,616,752 B1 | * | 9/2003 | Basura et al. ................ | 106/716 |
| 2002/0088524 A1 | * | 7/2002 | Gregg et al. .................. | 156/41 |
| 2002/0166479 A1 | * | 11/2002 | Jiang ........................... | 106/644 |
| 2003/0089065 A1 | * | 5/2003 | Brown ........................ | 52/414 |
| 2003/0093962 A1 | * | 5/2003 | Brown ........................ | 52/515 |
| 2003/0159391 A1 | * | 8/2003 | Naji et al. .................... | 52/425 |

FOREIGN PATENT DOCUMENTS

| | | |
|---|---|---|
| AU | 25900/25 | 11/1926 |
| AU | 21625/67 | 11/1968 |
| GB | 2 164 328 A | 3/1986 |

OTHER PUBLICATIONS

PCT International Search Report.
Derwent abstract accession No. 99–028983/03. JP 10291872 A, Nov. 4, 1998.
Derwent abstract accession No. 96–388515/39, JP 08188485 A, Jul. 23, 1996.
Derwent abstract accession No. 93–004214/01 JP 04331784 A, Nov. 19, 1992.
Derwent abstract accession No. 92–211946/26 JP 04139080 A, May 13, 1992.
Derwent abstract accession No. 85–220392/36 JP 60141–685 A, Jul. 26, 1985.
Derwent abstract accession No. 47987B/26, JP 54062220 A, May 19, 1979.
Derwent abstract accession No. 71514A/40, JP 53099220 A, Aug. 30, 1978.
Derwent abstract accession No. 98–435420/37, RU 2103242 C1, Jan. 27, 1998.
Derwent abstract accession No. 87–208180/30, HU T042–041 A, Jun. 29, 1987.
Derwent abstract accession No. 92–395199/48, JP 04295076 A1, Oct. 20, 1992.
Derwent abstract accession No. 80917D/44, JP 56120562 A, Sep. 21, 1981.

* cited by examiner

Primary Examiner—Brian E. Glessner
(74) Attorney, Agent, or Firm—Knobbe Martens Olson & Bear LLP

(57) ABSTRACT

A low or no fines lightweight concrete mixture. The mixture comprises one part by volume of a cementitious binder, 2–10 parts inert coarse aggregate, a cement additive in an amount of 0.05 to 0.3% by weight of the cementitious binder and an effective amount of water, the additive including 40–99% of a viscosity enhancing agent, which in water either dissolves or forms colloidal dispersions, and 1–60% of an air entrainment agent/surfactant adapted to entrain air when mixed with water and/or pumped. The mixture is particularly suitable for constructing a building panel where a frame is prepared, the front and rear faces being covered by fibre reinforced cementitious sheets and the cavity there between at least partially filled with the lightweight concrete mixture which flows in a manner similar to loose fill.

68 Claims, No Drawings

LIGHTWEIGHT WALL CONSTRUCTION

This is a section 371 filing of Application No. PCT/AU00/01524 filed Dec. 8, 2000.

TECHNICAL FIELD

The present invention relates to cementitious articles and particularly but not only walls, floors and the like of lightweight construction.

BACKGROUND OF THE INVENTION

There have been many proposals in the past for a lightweight contemporary monolithic wall system to replace conventional masonry walls. Lightweight walling systems provide significant advantages over the prior art particularly the reduction in load placed on foundations.

This has proved particularly difficult for external walling systems which require equivalent durability and load bearing capacity to conventional masonry. The lightweight systems must also be highly resistant to damage from impact, thermally and acoustically efficient and suitable for application of different decorative finishes.

Traditional systems also require skilled labour. Many replacement systems strive to be quicker, simpler and less expensive to install and less dependent on skilled labour.

Off-site construction can produce lightweight wall or floor panels for subsequent installation on-site. Transportation costs with such systems, however, are significant. In situ building systems are preferred for various reasons. Transportation costs are reduced and the in situ systems are also more flexible in the type of wall or floor which can be constructed. The systems also allow services to be installed in the wall during construction rather than subsequent installation.

Such in situ construction of lightweight walls, for example, began with the so-called "dry wall system". This was a sandwich wall comprised of timber or steel framing with thin sheeting of gypsum or fibre reinforced cement attached thereto. The wall cavity remained hollow. The system was limited to internal partitioning, however, due to its very low load bearing capacity, lack of durability and low mass.

The applicant has previously proposed a system for constructing a wall in which a lightweight aggregate concrete slurry is pumped into the void formed between two fibre cement sheets supported on a frame. This system essentially requires the entire wall to be filled with the concrete slurry. cementitious material. Additionally, since the cavity is essentially filled with a monolithic cementitious block, water cannot escape from inside the cavity wall.

The cost of lightweight aggregate is also quite high and in many cases is difficult to mix with a cementitious binder to provide a homogeneous mixture.

It is an object of the present invention to overcome or ameliorate at least one of the disadvantages of the prior art, or to provide a useful alternative.

DISCLOSURE OF THE INVENTION

In a first aspect, the present invention provides a lightweight concrete mix comprising 1 part by volume of a cementitious binder, 2–10 parts inert coarse aggregate, a cement additive in an amount of between 0.5–0.3% by weight of the cementitious binder and an effective amount of water, the additive including 40–99% of a viscosity enhancing agent which in water either dissolves or forms colloidal dispersions, and 1–60% of an air entrainment agent/surfactant adapted to entrain air when mixed with water and/or pumped.

In a second aspect, the present invention provides a method of constructing a panel comprising erecting a substantially rigid frame, attaching to the frame front and rear fibre reinforced cementitious sheets to form a cavity there between and providing to the cavity a lightweight concrete loose fill comprising one part by volume of a cementitious binder, 2–10 parts inert coarse aggregate, a cement additive in an amount of between 0.5–0.3% by weight of the cementitious binder and an effective amount of water, the additive including 40–99% of a viscosity enhancing agent which in water either dissolves or forms colloidal dispersions, and 1–60% of an air entrainment agent/surfactant adapted to entrain air when mixed with water and/or pumped.

The applicant has found that the use of a low or no fines concrete mixture for a building panel provides significant advantages over the prior art.

No fines concrete has previously been used to provide an external lightweight concrete wall. The procedure involved casting the concrete in conventional formwork, waiting for the mixture to cure, stripping the formwork and then rendering the wall surface. This last step was required since the no fines concrete wall is essentially filled with voids between the coated aggregate particles.

Several problems arose with such previous methods, however, including: surface. This last step was required since the no fines concrete wall is essentially filled with voids between the coated aggregate particles.

Several problems arose with such previous methods, however, including:

a) the need to maintain the formwork for extended periods (up to two weeks) until sufficient strength had been developed in the mixture. This was due to very little cohesion existing between the coarse aggregate particles since there were little or no fines to fill the gaps therebetween.

b) the no fines concrete had to be moist cured continuously for extended periods of time due to the limited volume of cement binder coating the coarse aggregate and its susceptibility to drying particularly in dry or windy conditions.

c) when used as external walling, this conventional wall was susceptible to moisture ingress from the outside due to the large volumes of connected pores existing in its honeycombed structure. As mentioned above, this could at least partially be remedied by rendering the inner and outer wall surfaces. Not only was this quite expensive, however, but it reduced the sound absorbing properties of the no fines concrete wall through closing of the surface pores and increasing its density.

The present applicant has found a novel mixture which allows the aggregate to bond well with each other and the FRC sheets on the frame, and overcomes or at least reduces some of the difficulties associated with conventional no fines concrete (NFC) by:

a) providing impact-resistant wall skins to act as permanent formwork and avoid the need to wait for curing and subsequent removal of formwork;

b) providing the wall skins to protect the curing mixture in the wall cavity thereby avoiding the need for continuous moisture curing of the core;

c) providing a smooth outer surface with the wall skins to avoid the need for rendering, prevent moisture ingress and maintain the acoustic performance of the no fines cement core.

The strength of bonding between the no fines cement core and the wall skins of the inventive method is quite surprising. Conventional NFC mixes which contain such high volumes of coarse aggregate and relatively low cement contents are normally incapable of generating sufficient binder surface area in contact with the wall skins to enable bondability.

In a third aspect, the present invention provides a building panel comprising a substantially rigid frame defining front and rear faces, front and rear fibre reinforced cementitious sheets attached to the frame to form a cavity there between, the cavity being at least partially filled with a lightweight concrete loose fill, wherein the lightweight loose fill comprises 1 part by volume of cementitious binder, 2–10 parts inert coarse aggregate, a cement additive in an amount between 0.05–0.3% by weight of the cementitious binder and an effective amount of water, the additive including 40–99% of a viscosity enhancing agent which in water either dissolves or forms colloidal dispersions and 1–60% of an air entrainment agent/surfactant adapted to entrain air when mixed with water and/or pumped.

The front and rear fibre reinforced cementitious sheets may be attached to the frame by any method known in the art including gluing, screwing and stapling as disclosed in International Patent Application No. PCT/AU99/00639 which is incorporated herein by reference.

Due to the absence of fines in the cementitious binder, the resulting mixture is highly porous and is composed of coarse aggregate bound together with a thin cement paste. Not only does the resultant wall panel have excellent load bearing capacity, it is drainable due to the presence of 20%–40% by mix volume of interconnected pores, and is an excellent insulator due to such a high volume of pores within the mix. It may in fact be designed for its drainability for use as retaining wall on side slopes, for example.

The novel cementitious mixture may completely fill the wall cavity if desired. Alternatively, the wall cavity may be partially filled with the no fines concrete mix and the remainder left dry or filled with another material such as polystyrene concrete.

While not wishing to be bound by any particular theory, the applicant believes that the present inventive mixture provides enhanced core/skin interface bonding due to the additional chemical bonding contributed by the cement additive and the enhanced moisture retention in the cementitious binder in contact with the wall skins. This last in a volume sufficient to coat the coarse aggregate particles, and efficient retention of water in the cementitious binder.

The proportion of said viscosity enhancing agent ranges from about 40 to about 99, preferably from about 60 to about 90 and still more preferably from about 70 to about 85 parts by weight per 100 parts by weight of the blend.

The proportion of said air entrainer is an amount in the range of from about 1 to about 60, preferably from about 10 to about 50 and still more preferably from about 20 to about 40 parts by weight per 100 parts by weight of the blend.

The term "viscosity enhancing agent" as used herein includes one or more thixotropic agents which either dissolve in water or which at least form colloidal dispersions in the presence of water wherein the effect is to produce an increase in the viscosity of the water. These include cellulose derivatives, polysaccharides and synthetic hydrophilic polymers.

Examples of cellulose derivatives useful in the composition of this invention include hydroxymethylcellulose, hydroxyethylcellulose and hydroxy propyl methyl cellulose.

Examples of polysaccharides useful in the composition of this invention include starches and alginate.

Examples of synthetic hydrophilic polymers and copolymers useful in the composition of this invention include polyvinyl alcohol and polyethylene and polypropylene oxides.

The term "air entraining agent" (AEAs) refers to surface active agents (surfactants) which act to entrain air in the composition as it is mixed with water and/or pumped. AEAs used in the present invention may include one or more nonionic, cationic and anionic surfactants such as sodium salts of alpha olefine sulphonates and sodium lauryl sulphate or sulphonate.

The term "cementitious binder" as used herein, means all inorganic materials which comprise compounds of calcium, aluminium, silicon, oxygen, and/or sulfur which The term "air entraining agent" (AEAs) refers to surface active agents (surfactants) which act to entrain air in the composition as it is mixed with water and/or pumped. AEAs used in the present invention may include one or more nonionic, cationic and anionic surfactants such as sodium salts of alpha olefine sulphonates and sodium lauryl sulphate or sulphonate.

The term "cementitious binder" as used herein, means all inorganic materials which comprise compounds of calcium, aluminium, silicon, oxygen, and/or sulfur which exhibit "hydraulic activity" that is, which set solid and harden in the presence of water. Cements of this type include common Portland cements, fast setting or extra fast setting, sulphate resisting cements, modified cements, alumina cements, high alumina cements, calcium aluminate cements and cements which contain secondary components such as fly ash, pozzolana and the like.

The term "cementitious binder" as used herein, also includes a material identified as slag and mixtures thereof with Portland cement.

The term "coarse aggregate" refers to the aggregate being inert with respect to other components of the mixture. It includes graded and ungraded aggregate such as washed river gravel, crushed igneous rock or limestone, lightweight aggregate, pumice, scoria, expanded shale (foamed clay) and other artificial aggregates, crushed hard-burnt clay bricks or air-cooled blast furnace slag. It preferably fits within the following criteria:

| Size range: | 5 mm to 20 mm, |
| --- | --- |
| Maximum % coarser than 20 mm size: | 5% |
| Maximum % finer than 5 mm size: | 10% |

The ideal coarse aggregate grading is:

single size (gap graded), with highest proportion ranging between 10 mm to 20 mm.

containing minimum fines, preferably zero.

The load bearing capacity of the cured material is between approximately 5 to 20 MPa. To assist in load bearing, the lightweight cementitious material may include 0 to 40% of a thickener, high reactive pozzalanes, such as silica fumes, water sealing agents, water reducing agents, setting rate modifiers, hardeners, plasticisers or waterproofing agents.

The initial quantity of water in the cementitious loose fill will depend upon a number of factors including the type and content of other constituents. In most cases, a water to cement ratio of 0.3 to 0.8 and preferably 0.5 to 0.7 is sufficient to ensure pumpability of the loose fill and adhesion of the aggregate particles to themselves and the FRC sheets.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

So that the present invention may be more clearly understood it will now be described with reference to the following examples:

EXAMPLE 1

Effect of cement additive addition in NFC mixes containing high aggregate volume on core/skin bonding Three mix ratios representing NFC mixes that were mostly applied in prior art, ie 1:6, 1:8 and 1:9 by bulk volume of cement, were chosen. The mix design data corresponding to the three mix ratios are shown in Table 1.

TABLE 1

Mix design of NFC mixes with various mix ratios

| NFC Mix | Mix Ratio (by vol.) | Porosity, % | Density $kg/m^3$ | Cement Content per $m^3$ of mix | Agg. content per $m^3$ of mix |
|---|---|---|---|---|---|
| 1:6 Mix | | | | | |
| Cement | 1 | 27 | 1733 | 200 | 867 |
| Aggregate | 6 | | | | |
| W/C ratio | 0.61 | | | | |
| 1:8 Mix | | | | | |
| Cement | 1 | 29 | 1667 | 155 | 894 |
| Aggregate | 8 | | | | |
| W/C ratio | 0.64 | | | | |
| 1:9 Mix | | | | | |
| Cement | 1 | 30 | 1633 | 140 | 905 |
| Aggregate | 9 | | | | |
| W/C ratio | 0.66 | | | | |

Two sets of mixes were produced for each mix ratio using machine mixing. One set was conventionally produced as in prior. The other set contained the cement blend additive at the addition rates shown in Table 2.

TABLE 2

Cement additive addition rates in NFC mixes

| Cement additive component | Material description | Addition rate |
|---|---|---|
| Organic polymeric material: | Cellulose ether | 0.07% by weight of cement |
| Air entraining agent: | Anionic surfactant | 0.03% by weight of cement |

The mixing sequence was as follows:
a) Water and cement additive were added and allowed to mix and generate foam.
b) Coarse aggregate were batched and allowed to wet fully.
c) Cement was added and mixing was continued until all aggregate were coated with foamed cement mix.

Prototype sandwich composite walls (2400 mm long× 2400 mm wide×100 mm thick) comprised of thin fibre reinforced cement skins fixed onto steel stud/track framing were built and wall cavities were filled with the various NFC mixes produced. The wall configurations and details of NFC mixes vs skin/core bond outcomes are shown in Table 3.

TABLE 3

Data corresponding to walls filled with various NFC mix ratios

| Wall configuration | | | NFC mix details | | | |
|---|---|---|---|---|---|---|
| Wall skin (commercial name)* | Wall skin thickness (mm) | Steel stud spacing (mm) | NFC mix ratio (by vol. of bulk cement) | NFC mix density $kg/m^3$ | Cement additive addition | Skin/core bond outcomes |
| Hardiflex Pro | 6.0 | 450 | 1:6 | 1733 | without additive | debonded |
| | | | | | with additive | bonded |
| Hardiflex Pro | 6.0 | 450 | 1:8 | 1666 | without additive | debonded |
| | | | | | with additive | bonded |
| Hardiflex Pro | 6.0 | 450 | 1:9 | 1633 | without additive | debonded |
| | | | | | with additive | bonded |
| Hardiflex | 4.5 | 450 | 1:6 | 1733 | without additive | debonded |

TABLE 3-continued

Data corresponding to walls filled with various NFC mix ratios

| Wall configuration | | | NFC mix details | | | |
|---|---|---|---|---|---|---|
| Wall skin (commercial name)* | Wall skin thickness (mm) | Steel stud spacing (mm) | NFC mix ratio (by vol. of bulk cement) | NFC mix density kg/m³ | Cement additive addition | Skin/core bond outcomes |
| Hardiflex | 4.5 | 450 | 1:8 | 1666 | with additive | bonded |
|  |  |  |  |  | without additive | debonded |
| Hardiflex | 4.5 | 450 | 1:9 | 1633 | with additive | bonded |
|  |  |  |  |  | without additive | debonded |
|  |  |  |  |  | with additive | bonded |

*Cellulose fibre-reinforced cementitious sheet laminates (trade name: fibre cement)

Table 3 shows that NFC mixes containing coarse aggregate ranging between 6 to 9 by volume of bulk cement addition have failed to bond with the composite wall skins. This is expected as these mixes contain low cement contents (ranging between 200 kg/m³ to 140 kg/m³ of mix—Table 1) resulting in low cement paste/coarse aggregate volume ratios, ie limited cement paste volumes, which are unable to provide sufficient binder surface area at the skin/core interface to enable bonding.

On the other hand, the NFC mixes containing cement additive components at the addition rates shown in Table 2 were surprisingly able to bond well with the fibre-reinforced cementitious skins.

It is hypothesised that the presence of the cement additive in the mix enables:
  a) efficient wetting of the coarse aggregate prior to cement addition.
  b) generation of foamed cement paste in sufficient volume for coating the coarse aggregate in lean NFC mixes (cement content<200 kg/m³).
  c) efficient water retention in the cement paste which reduces water deprivation in NFC mixes and consequent debonding due to water absorption by highly permeable FRC skins.
  d) effective core/sheet bond in lean NFC mixes due to the bonding characteristics of the cement blend additive.

EXAMPLE 2

Pumpability of the NFC mixes containing cement blend additive

This test aims to produce NFC mixes that could be pumped into sandwich wall cavities to form a flat solid wall in which the core infill (NFC mix) is well-bonded with the sandwich fibre cement (FRC) skins.

NFC Mix Details

A 1:7 cement: aggregate volumetric mix ratio was chosen as a standard NFC core infill mix (cement content=177 kg/m³ of mix, aggregate content=0.88 m³/m³ of mix). The cement blend additive was dosed at the addition rates shown in Table 4.

Five NFC mixes containing a wide range of aggregate types and sizes were investigated for pumpability, as shown in Table 5.

TABLE 4

Cement additive addition rate in the 1:7 NFC mix

| Cement additive component | Material description | Addition rate |
|---|---|---|
| Viscosity enhancing agent: | Cellulose ether | 0.09% by weight of cement |
| Air entraining agent: | Anionic surfactant | 0.04% by weight of cement |

TABLE 5

Details of 1:7 cement:aggregate (by volume) NFC mixes with various aggregate types and sizes

| Mix Designation | Aggregate Type | Aggregate Max. Size (mm) | NFC Density (kg/m³) | NFC Porosity (%) | Water/Cement ratio (by weight) |
|---|---|---|---|---|---|
| NFC 20 R | Rounded agg. (Nepean River) | 20 | 1650 | 32 | 0.50 |
| NFC 10 R | Rounded agg. (Nepean River) | 10 | 1725 | 29 | 0.60 |
| NFC 20 C | Crushed stone (Blue Metal) | 20 | 1500 | 37 | 0.50 |
| NFC 10 C | Crushed stone (Blue Metal) | 10 | 1625 | 32 | 0.60 |
| NFC 10 S | Lightweight volcanic agg. (Scoria) | 10 | 1200 | 30 | 0.50 |

Wall Configurations

Four (1.2 m wide×2.4 m high) prototype sandwich walls lined with fibre cement (FRC) skins were built. They included two staple-fixed sandwich walls and two screw-fixed sandwich walls (configurations as shown in Table 6).

TABLE 6

Prototype wall configurations

| Wall No. | Mix Designation | FRC Sheet Type (*) | Stud Type | Stud Spacing (mm) | Sheet Fixing Methodology | Mix Drop Height (mm) |
|---|---|---|---|---|---|---|
| Wall # 1 | NFC 20 R | 6.6 mm Hardiwall ™ | 70 mm box section | 400 | Staple-fixed @ 100 mm c/c | 2700 |
| Wall # 2 | NFC 10 R | 6.6 mm Hardiwall ™ | 70 mm box section | 400 | Staple-fixed @ 100 mm c/c | 2700 |
| Wall # 3 | NFC 10 S | 6.6 mm Hardiwall ™ | 64 mm C-section | 400 | Screw-fixed @ 150 mm c/c | 2700 |
| Wall # 4 | NFC 20 C | 6.6 mm Hardiwall ™ | 64 mm C-section | 300 | Screw-fixed @ 150 mm c/c | 2700 |
| Wall # 5 | NFC 10 C | 6.0 mm Hardiflex ™ | 64 mm C-section | 600 | Screw-fixed @ 200 mm c/c | 2700 |
| Wall # 6 | NFC 10 C | 6.0 mm Hardiflex ™ | 70 mm box section | 400 | Staple-fixed @ 200 mm c/c | 2700 |
| Wall # 7 | NFC 10 C | 4.5 mm Hardiflex ™ | 70 mm box section | 400 | Staple-fixed @ 100 mm c/c | 2700 |
| Wall # 8 | NFC 10 C | 6.0 mm Hardiflex ™ | 90 mm C-section | 400 | Screw-fixed @ 200 mm c/c | 6000 |

(*) Cellulose fibre-reinforced cementitious sheet laminates (trade name: fibre cement)

The trial used a 200 litre tilting mixture to produce the five NFC mixes outlined in Table 5. The mixing sequence was as follows.

1. Water and the cement additive were added and allowed to mix and generate foam.
2. Course aggregate was then batched and allowed to wet fully.
3. Cement was added and mixing was continued until all aggregate were coated with the foamed cement mix.

Each mix was then pumped into the cavities in the various walls (outlined in Table 6) using a rubber hose of 50 mm diameter. The pump used was a pneumatic rotary dry mix spraying machine. This machine is designed for SHOT-CRETE™ and GUNITE™ applications but it was speculated may be able to pump the NFC mix. The following potential difficulties, however, were identified in using such a machine to convey the NFC mixture:

a) Line blockage due to aggregate interlock and absence of finds in the NFC mix,
b) Back-spraying of the NFC mix and incomplete filing of the wall cavity due to the excessive thrust generated by the pneumatic rotary spraying machine, and
c) Blowing out of the FRC skins (especially the staple-fixed skins) due to the excessive thrust generated by the pneumatic rotary spraying machine.

To avoid at least some of these difficulties, the pump was operated at a very low pressure (less than 30% of normal pressure required for Guniting or Shotcreting). Pumping was continued until all the wall cavities were filled and the wall were inspected the next day for evidence of core/skin bondability.

The results of this test were quite surprising.

The NFC mixes exhibit the flow behaviour of loose fill, whilst being pumpable similar to wet concrete mixes.

The pneumatic rotary spraying machine, which was designed primarily for spraying dry concrete mixes, was able to pump the wet NFC mixes with water/cement ratios of around 0.5 by weight, and containing 10 mm and 20 mm maximum aggregate size without any line blockage or jamming.

The sandwich walls were successfully filled with NFC mixes. Complete void-free filing of cavities was achieved. The NFC mixes appeared to flow, consolidate and fill all wall cavities without bridging or clumping.

The staple-fixed walls were able to withstand the dynamic thrust generated due to core filling without blowing out. Especially surprising was wall # 7 in Table 6 above which incorporated a 4.5 mm thick fibre cement sheet. This thickness is outside the normal range conventionally used for permanent form work in concrete filled cavities. Such a thin sheet would normally be expected to blow out or bow considerably.

Filling from a six metre height in one lift was carried out successfully without excessive bowing, sheet blow out or presence of unfilled core areas (see wall #8 in Table 6 above). This is very surprising since this test was expected to exhibit some unfilled areas near the bottom of the wall due to the height of the drop.

Wall cavities with 600 mm c/c stud spacing were successfully filled without excessive bowing or sheet blow out (see wall # 5 in Table 6 above). This was entirely unexpected since such a large span between studs, ie 600 mm would normally cause excessive bowing or sheet blow out.

The sandwich walls (including the staple-fixed walls) were successfully completely filled with the NFC mixes. The NFC mixes appeared to flow, consolidate and fill all the wall cavities without bridging or clumping.

Consistent bondability was achieved between the NFC core infill and the FRC skins thus enabling the sandwich walls to exhibit solid masonry feel.

The resultant core-filled walls exhibited very good surface flatness with bowing between the studs in the core-filled walls of less than 1 mm.

As a result, it was clear that the low or no fines concrete mix arising from the present invention provided an excellent pumpable mix. The use of the pneumatic rotary dry mix spraying machine for pumping such a low or no fines concrete mix was also quite surprising. In particular, the combination of the cement additive along with the reduction in normal pressure provide a significant advance in techniques and machinery for filling cavity walls.

Accordingly, it can be seen that the present invention provides a viable alternative to conventional masonry systems and current lightweight wall systems. It will further be appreciated that the disclosed panel construction may be altered or embodied in other forms without departing from the spirit or scope of the present invention.

The claims defining the invention are as follows:

1. A lightweight concrete mix comprising 1 part by volume of a cementitious binder, 2–10 parts inert coarse aggregate, a cement additive in an amount of between 0.05–0.3% by weight of the cementitious binder, and an effective amount of water, the additive comprising 40–99% of a viscosity enhancing agent, which in water either dissolves or forms colloidal dispersions, and 0–60% of an air entraining agent/surfactant adapted to entrain air when mixed with water and/or pumped.

2. The lightweight concrete mix as claimed in claim 1, wherein the additive comprises 60–90% of a viscosity enhancing agent.

3. The lightweight concrete mix as claimed in claim 2, wherein the additive comprises 70–85% of a viscosity enhancing agent.

4. The lightweight concrete mix as claimed in claim 1, wherein the additive comprises 10–50% of the air entraining agent/surfactant.

5. The lightweight concrete mix as claimed in claim 4, wherein the additive comprises 20–40% of the air entraining agent/surfactant.

6. The lightweight concrete mix as claimed in claim 1, wherein the viscosity enhancing agent comprises one or more thixotropic agents which either dissolve in water or form colloidal dispersions in the presence of water to produce an increase in the viscosity of the water.

7. The lightweight concrete mix as claimed in claim 6, wherein the viscosity enhancing agent is selected from the group consisting of cellulose derivatives, polysaccharides, and synthetic hydrophilic polymers and copolymers.

8. The lightweight concrete mix as claimed in claim 7, wherein the viscosity enhancing agent is selected from the group consisting of hydroxymethylcellulose, hydroxyethylcellulose, and hydroxypropylmethylcellulose.

9. The lightweight concrete mix as claimed in claim 7, wherein the viscosity enhancing agent is selected from the group consisting of starches and alginate.

10. The lightweight concrete mix as claimed in claim 7, wherein the viscosity enhancing agent is a synthetic hydrophilic polymer or copolymer selected from the group consisting of polyvinyl alcohols, polyethylene oxides, and polypropylene oxides.

11. The lightweight concrete mix as claimed in claim 1, wherein the air entraining agent comprises one or more nonionic, cationic, or anionic surfactants.

12. The lightweight concrete mix as claimed in claim 11, wherein the air entraining agent is selected from the group consisting of sodium salts of alpha olefin sulphonates, sodium lauryl sulphate, and sodium lauryl suiphonate.

13. The lightweight concrete mix as claimed in claim 1, wherein the cementitious binder is an inorganic material comprising calcium, aluminium, silicon, oxygen, or sulphur compounds with sufficient hydraulic activity to solidify or harden in the presence of water.

14. The lightweight concrete mix as claimed in claim 13, wherein the cementitious binder is selected from the group consisting of common portland cements, fast setting cements, extra fast setting cements, sulphate resisting cements, modified cements, alumina cements, high alumina cements, calcium aluminate cements, and cements containing secondary compounds.

15. The lightweight concrete mix as claimed in claim 1, wherein the coarse aggregate has a size range of between 5–20 mm with 5% maximum aggregate coarser than 20 mm and 10% maximum finer than 5 mm size.

16. The lightweight concrete mix as claimed in claim 15, wherein the coarse aggregate is gap graded as a single size with the highest proportion being between 10–20 mm.

17. The lightweight concrete mix as claimed in claim 15, wherein the coarse aggregate contains between 0% and 10% by weight of fines.

18. The lightweight concrete mix as claimed in claim 1, wherein the coarse aggregate is inert with respect to the other components of the mixture and is selected from the group consisting of washed river gravel, crushed igneous rock, crushed limestone, lightweight aggregate, pumice, scoria, expanded shale, foamed clay, artificial aggregates, crushed hard-burnt clay bricks, and air-cooled blast furnace slag.

19. The lightweight concrete mix as claimed in claim 1, wherein for load bearing purposes, the mix further comprises up to about 40% of a thickener, high reactive pozzalanes, water sealing agents, water reducing agents, setting rate modifiers, hardeners, plasticisers, water-proofing agents, or a combination thereof.

20. The lightweight concrete mix as claimed in claim 1, wherein the water to cement ratio is 0.3–0.8.

21. The lightweight concrete mix as claimed in claim 20, wherein the water to cement ratio is 0.4–0.7.

22. A method of constructing a panel comprising erecting a substantially rigid frame, attaching to the frame front and rear fibre reinforced cementitious sheets to form a cavity there between and providing to the cavity a lightweight concrete loose fill comprising 1 part by volume of a cementitious binder, 2–10 parts inert coarse aggregate, a cement additive in an amount of between 0.05–0.3% by weight of the cementitious binder and an effective amount of water, the additive comprising 40–99% of a viscosity enhancing agent, which in water either dissolves or forms colloidal dispersions, and 1–60% of an air entraining agent/surfactant adapted to entrain air when mixed with water and/or pumped.

23. The method as claimed in claim 22, wherein the entire cavity is filled with the lightweight concrete loose fill.

24. The method as claimed in claim 22, wherein the cavity is partially filled with the lightweight concrete loose fill, the remainder being left dry or filled with another material.

25. The method as claimed in claim 22, wherein the additive comprises 60–90% of a viscosity enhancing agent.

26. The method as claimed in claim 25, wherein the additive comprises 70–85% of a viscosity enhancing agent.

27. The method as claimed in claim 22, wherein the additive comprises 10–50% of the air entraining agent/surfactant.

28. The method as claimed in claim 27, wherein the additive comprises 20–40% of the air entraining agent/surfactant.

29. The method as claimed in claim 22, wherein the viscosity enhancing agent comprises one or more thixotropic agents which either dissolve in water or form colloidal dispersions in the presence of water to produce an increase in the viscosity of the water.

30. The method as claimed in claim 29, wherein the viscosity enhancing agent is selected from the group consisting of cellulose derivatives, polysaccharides, and synthetic hydrophilic polymers and copolymers.

31. The method as claimed in claim 30, wherein the viscosity enhancing agent is selected from the group consisting of hydroxymethylcellulose, hydroxyethylcellulose, and hydroxypropylmethylcellulose.

32. The method as claimed in claim 30, wherein the viscosity enhancing agent is selected from the group consisting of starches and alginate.

33. The method as claimed in claim 30, wherein the viscosity enhancing agent is a synthetic hydrophilic polymer or copolymer selected from the group consisting of polyvinyl alcohols, polyethylene oxides, and polypropylene oxides.

34. The method as claimed in claim 22, wherein the air entraining agent comprises one or more nonionic, cationic, or anionic surfactants.

35. The method as claimed in claim 34, wherein the air entraining agent is selected from the group consisting of sodium salts of alpha olefin sulphonates, sodium lauryl sulphate, and sodium lauryl sulphonate.

36. The method as claimed in claim 22, wherein the cementitious binder is an inorganic material comprising calcium, aluminium, silicon, oxygen, or sulphur compounds with sufficient hydraulic activity to solidify or harden in the presence of water.

37. The method as claimed in claim 36, wherein the cementitious binder is selected from the group consisting of common portland cements, fast setting cements, extra fast setting cements, sulphate resisting cements, modified cements, alumina cements, high alumina cements, calcium aluminate cements, and cements containing secondary compounds.

38. The method as claimed in claim 22, wherein the coarse aggregate has a size range of between 5–20 mm with 5% maximum aggregate coarser than 20 mm and 10% maximum finer than 5 mm size.

39. The method as claimed in claim 38, wherein the coarse aggregate is gap graded as a single size with the highest proportion being between 10–20 mm.

40. The method as claimed in claim 38, wherein the coarse aggregate contains between 0% and 10% by weight of fines.

41. The method as claimed in claim 22, wherein the coarse aggregate is inert with respect to the other components of the mixture and is selected from the group consisting of washed river gravel, crushed igneous rock, crushed limestone, lightweight aggregate, pumice, scoria, expanded shale, foamed clay, artificial aggregates, crushed hard-burnt clay bricks, and air-cooled blast furnace slag.

42. The method as claimed in claim 22, wherein for load bearing purposes, the mix further comprises up to about 40% of a thickener, high reactive pozzalanes, water sealing agents, water reducing agents, setting rate modifiers, hardeners, plasticisers, water-proofing agents, or a combination thereof.

43. The method as claimed in claim 22, wherein the water to cement ratio is 0.3–0.8.

44. The method as claimed in claim 43, wherein the water to cement ratio is 0.4–0.7.

45. A building panel comprising a substantially rigid frame defining front and rear faces, front and rear fibre reinforced cementitious sheets attached to the frame to form a cavity there between, the cavity being at least partially filled with a lightweight concrete loose fill,
wherein the lightweight loose fill comprises 1 part by volume of cementitious binder, 0–10 parts inert coarse aggregate, a cement additive in an amount between 0.05–0.3% by weight of the cementitious binder and an effective amount of water,
the additive comprising 40–99% of a viscosity enhancing agent, which in water either dissolves or forms colloidal dispersions, and 1–60% of an air entraining agent/surfactant adapted to entrain air when mixed with water and/or pumped.

46. The building panel as claimed in claim 45, wherein the entire cavity is filled with the lightweight concrete loose fill.

47. The building panel as claimed in claim 45, wherein the cavity is partially filled with the lightweight concrete loose fill, the remainder being left dry or filled with another material.

48. The building panel as claimed in claim 45, wherein that portion of the cavity filled with a lightweight concrete loose fill has, on curing between 20–40% by volume of interconnected pores/voids.

49. The building panel as claimed in claim 45, wherein the additive comprises 60–90% of a viscosity enhancing agent.

50. The building panel as claimed in claim 49, wherein the additive comprises 70–85% of a viscosity enhancing agent.

51. The building panel as claimed in 45, wherein the additive comprises 10–50% of the air entraining agent/surfactant.

52. The building panel as claimed in claim 51, wherein the additive comprises 20–40% of the air entraining agent/surfactant.

53. The building panel as claimed in claim 45, wherein the viscosity enhancing agent comprises one or more thixotropic agents which either dissolve in water or form colloidal dispersions in the presence of water to produce an increase in the viscosity of the water.

54. The building panel as claimed in claim 53, wherein the viscosity enhancing agent is selected from the group consisting of cellulose derivatives, polysaccharides, and synthetic hydrophilic polymers and copolymers.

55. The building panel as claimed in claim 54, wherein the viscosity enhancing agent is selected from the group consisting of hydroxymethylcellulose, hydroxyethylcellulose, and hydroxypropylmethylcellulose.

56. The building panel as claimed in claim 54, wherein the viscosity enhancing agent is selected from the group consisting of starches and alginate.

57. The building panel as claimed in claim 54, wherein the viscosity enhancing agent is a synthetic hydrophilic polymer or copolymer selected from the group consisting of polyvinyl alcohols, polyethylene oxides, and polypropylene oxides.

58. The building panel as claimed in claim 45, wherein the air entraining agent comprises one or more nonionic, cationic, or anionic surfactants.

59. The building panel as claimed in claim 58, wherein the air entraining agent is selected from the group consisting of sodium salts of alpha olefin sulphonates, sodium lauryl sulphate, and sodium lauryl sulphonate.

60. The building panel as claimed in claim 45, wherein the cementitious binder is an inorganic material comprising calcium, aluminium, silicon, oxygen, or sulphur compounds with sufficient hydraulic activity to solidify or harden in the presence of water.

61. The building panel as claimed in claim 60, wherein the cementitious binder is selected from the group consisting of common portland cements, fast setting cements, extra fast setting cements, sulphate resisting cements, modified cements, alumina cements, high alumina cements, calcium aluminate cements, and cements containing secondary compounds.

62. The building panel as claimed in claim 45, wherein the coarse aggregate has a size range of between 5–20 mm with 5% maximum aggregate coarser than 20 mm and 10% maximum finer than 5 mm size.

63. The building panel as claimed in claim 62, wherein the coarse aggregate is gap graded as a single size with the highest proportion being between 10–20 mm.

64. The building panel as claimed in claim 62, wherein the coarse aggregate contains between 0% and 10% by weight of fines.

65. The building panel as claimed in claim 45, wherein the coarse aggregate is inert with respect to the other components of the mixture and is selected from the group consisting of washed river gravel, crushed igneous rock, crushed limestone, lightweight aggregate, pumice, scoria, expanded shale, foamed clay, artificial aggregates, crushed hard-burnt clay bricks, and air-cooled blast furnace slag.

66. The building panel as claimed in claim 45, wherein for load bearing purposes, the mix further comprises up to about 40% of a thickener, high reactive pozzalanes, water sealing agents, water reducing agents, setting rate modifiers, hardeners, plasticisers, water-proofing agents, or a combination thereof.

67. The building panel as claimed in claim 45, wherein the water to cement ratio is 0.3–0.8.

68. The building panel as claimed in claim 67, wherein the water to cement ratio is 0.4–0.7.

* * * * *

UNITED STATES PATENT AND TRADEMARK OFFICE
CERTIFICATE OF CORRECTION

PATENT NO. : 6,907,708 B2
DATED : June 21, 2005
INVENTOR(S) : Basil Taha Naji et al.

It is certified that error appears in the above-identified patent and that said Letters Patent is hereby corrected as shown below:

<u>Column 11,</u>
Line 15, delete "0-60%" and insert -- 1-60% --.
Line 37, delete "polysaceharides" and insert -- polysaccharides --.
Line 57, delete "suiphonate" and insert -- sulphonate --.

<u>Column 13,</u>
Line 64, delete "0-10" and insert -- 2-10 --.

Signed and Sealed this

Second Day of May, 2006

JON W. DUDAS
*Director of the United States Patent and Trademark Office*